UNITED STATES PATENT OFFICE.

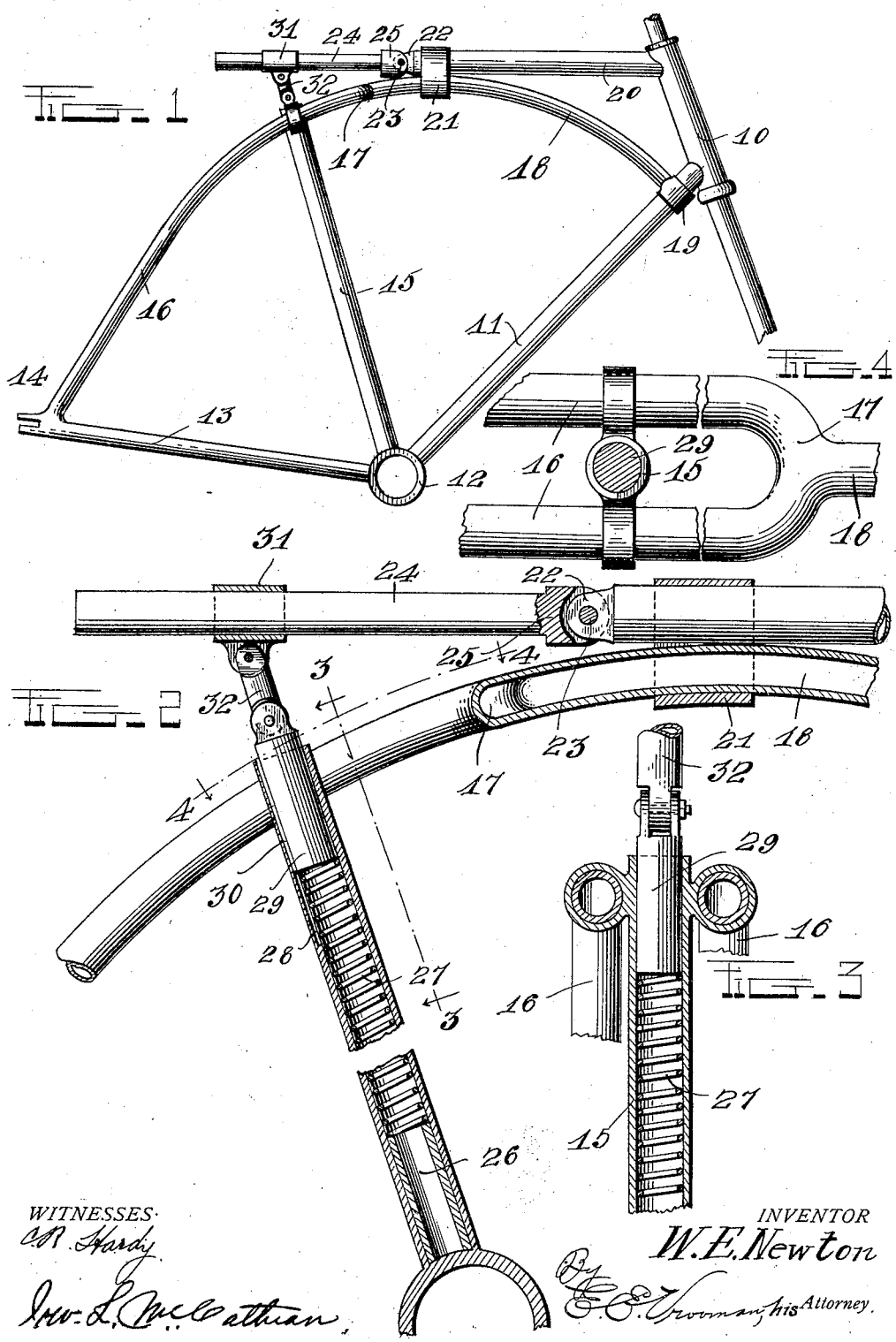

WILLIS E. NEWTON, OF TACOMA, WASHINGTON.

BICYCLE-FRAME.

1,056,573.  Specification of Letters Patent.  Patented Mar. 18, 1913.

Application filed May 1, 1912. Serial No. 694,365.

*To all whom it may concern:*

Be it known that I, WILLIS E. NEWTON, a citizen of the United States, residing at Tacoma, in the county of Pierce and State of Washington, have invented certain new and useful Improvements in Bicycle-Frames, of which the following is a specification, reference being had therein to the accompanying drawing.

This invention relates to bicycles and has special reference to a novel form of frame for such bicycles.

The principal object of the invention is to improve and simplify the general construction of bicycle frames.

A second object of the invention is to provide an improved form of bicycle frame wherein a resilient support will be provided for the rider's seat.

With the above and other objects in view, the invention consists in general of certain novel constructions, combinations and arrangements of parts, as will be hereinafter fully described, illustrated in the accompanying drawings, and specifically claimed.

In the accompanying drawings, like characters of reference indicate like parts in the several views, and Figure 1 is a side elevation of the bicycle frame constructed in accordance with this invention. Fig. 2 is an enlarged detail section on the median vertical plane thereof. Fig. 3 is a section on the line 3—3, Fig. 2. Fig. 4 is a detail section on the line 4—4, Fig. 2.

This bicycle frame is built up in the usual manner of tubing welded or brazed together and comprises a front member 10 whereto is secured a tube 11 extending rearward and downward from the lower end of the front member. On the lower end of the tube 11 there is provided a casing 12 in the form of a large tube extending transverse the frame and this casing receives the hub of the usual sprocket common in bicycles. Extending rearwardly from each end of the tube 12 is a bottom frame member 13 having the usual fork 14 at its rear for the reception of the ends of the rear wheel hub, it being understood that the rear wheel, of course, lies between the two members 13. Extending upwardly and rearwardly from the casing 12 is a tube 15, the purpose of which will be hereinafter explained.

From a point adjacent the rear end of each member 13 there extends a brace 16 which is brazed or welded to the member 15 and just in advance of the member 15, these two members 16 unite as at 17 and are continued by a single tube 18 to a ring 19 surrounding the upper end of the tube 11 adjacent the front member 10. From a point somewhat to the rear of the member 15 to this ring 19 the structure formed by the tubes 16 and 18 is arcuate, as clearly shown in Fig. 1. Extending rearwardly from the upper part of the tube 10 is a top member 20 which is secured to the tube 18 by a suitable band 21 brazed or otherwise suitably held in position. At the rear end of the tube 20 there is provided an ear 22 and secured to this ear by a pivot pin 23 is a seat bar 24 whereon is secured any of the usual forms of saddle.

It is to be noted that the forward end of the seat bar is enlarged as at 25 and formed to straddle the ear 22. In the lower end of the tube 15 is held a sleeve 26 above which is a coil spring 27, the upper end of the tube 15 being provided with a key-way or spline-way 28, and movable in this upper end is a plunger 29 provided with a key 30 slidable in the spline-way 28. This spline-way rests on the upper end of the spring 27 and is normally urged upward and outward by said spring. On the bar 24 is a collar 31 and this collar is connected to the upper end of the plunger 29 by a suitable link 32.

It will be observed that as the rider goes over rough places in the road the plunger will move up and down in the tube 15 and thus relieve the vibration and jarring incident to riding over rough roads.

There has thus been provided a simple and efficient device of the kind described, and for the purpose specified.

It will be obvious that in case it is so desired the joint shown at 17 may be omitted and the two pipes 16 carried forward to the connection 19 thus replacing the single pipe 18. This construction is to be preferred in most instances because of the fact that the forked joints will be thus omitted and the difficulty of forging this joint overcome.

Having thus described the invention, what is claimed as new, is:—

In a bicycle frame, a front bar, a bottom bar extending rearwardly and downwardly from the lower end of said front bar, a sprocket hub receiving casing carried by the lower end of said bottom bar, a pair of bottom frame bars extending rearwardly from said casing, a diagonal strut member extending upwardly and rearwardly from said casing, a pair of rear members extending upwardly from points adjacent the rear ends of said bottom members, and secured to the upper end of said strut member on opposite sides thereof, said members having their upper portions arcuate, arcuate extensions on said members extending forward of the strut member, a single arcuate member connected to the forward end of said pair of members, a top member extending rearwardly from the upper end of the front member, means for connecting said top member and the single arcuate member, a connection between said single arcuate member and the first mentioned bottom member, a seat bar having its forward end pivoted to the rear end of the top member, a spring in said strut, a plunger in said strut resting on said spring, a collar surrounding said seat bar, and a link connecting the upper end of said plunger with the collar.

In testimony whereof I hereunto affix my signature in presence of two witnesses.

WILLIS E. NEWTON.

Witnesses:
SAMUEL F. McANALLY,
CHAS. A. ELLISON.

Copies of this patent may be obtained for five cents each, by addressing the "Commissioner of Patents, Washington, D. C."